(12) United States Patent
Li

(10) Patent No.: US 6,401,214 B1
(45) Date of Patent: Jun. 4, 2002

(54) PREVENTIVE RECOVERY ACTION IN HARD DISK DRIVES

(75) Inventor: Robert Yuan-Shih Li, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/262,426

(22) Filed: Mar. 4, 1999

(51) Int. Cl.⁷ .................................................. G06F 11/00
(52) U.S. Cl. ........................................... 714/6; 711/112
(58) Field of Search ............................ 714/6, 56, 7, 48, 714/5, 57, 15; 711/100, 112; 710/1; 360/55, 75, 97.01, 69; 369/47, 58; 713/323

(56) References Cited

U.S. PATENT DOCUMENTS

| | | | |
|---|---|---|---|
| 5,270,880 A | 12/1993 | Ottesen et al. ............... 360/60 |
| 5,359,728 A | 10/1994 | Rusnack et al. ............. 395/575 |
| 5,371,882 A | 12/1994 | Ludlam ....................... 395/575 |
| 5,386,549 A | 1/1995 | Norrie et al. ............... 395/575 |
| 5,390,187 A | 2/1995 | Stallmo ..................... 371/10.1 |
| 5,410,439 A | * 4/1995 | Egbert et al. |
| 5,422,890 A | 6/1995 | Klingsporn et al. ....... 371/21.6 |
| 5,553,086 A | 9/1996 | Sompel et al. ............. 371/47.1 |
| 5,623,595 A | 4/1997 | Bailey ..................... 395/182.04 |
| 5,717,850 A | 2/1998 | Apperley et al. ....... 395/182.04 |
| 5,727,144 A | * 3/1998 | Brady et al. |
| 5,832,199 A | * 11/1998 | Apperley et al. |
| 5,986,426 A | * 11/1999 | Rowan |
| 6,160,674 A | * 12/2000 | Yun et al. |

OTHER PUBLICATIONS

JP 6243618 A, Sep. 2, 1994, Kazuhisa et al., Abstract only.

* cited by examiner

*Primary Examiner*—Gopal C. Ray
(74) *Attorney, Agent, or Firm*—Norreen A. Krall; Bracewell & Patterson, L.L.P.

(57) ABSTRACT

A method in a data processing system for minimizing read/write errors caused by impaired performance of a hard disk drive during runtime operation of the hard disk drive. The runtime operation includes an active mode during which read/write operations are conducted and a standby mode which occurs while no read/write operation is underway. First, at least one performance parameter of a hard disk drive is monitored during a standby mode of operation. Next, in response to detecting a degraded value of the at least one performance parameter, performing preventive recovery action only during the standby mode of operation, such that the performance parameter is restored to an acceptable value without interfering with hard disk drive operation during an active mode.

11 Claims, 6 Drawing Sheets

PREVENTIVE RECOVERY ACTION IN HARD DISK DRIVES

BACKGROUND OF THE INVENTION

1. Technical Field

The present invention relates to an improved digital storage system. In particular, the present invention relates to a method and system for preventing hard disk drive failures. More particularly, the present invention relates to, in response to detecting an imminent hard disk drive failure, a method and system for taking corrective action to prevent a failure. Still more particularly, the present invention relates to utilizing predictive failure analysis to determine that corrective action is necessary and undertaking such corrective action thereby minimizing hard disk drive failures and the effects thereof.

2. Description of the Related Art

Generally, a digital data storage system consists of one or more storage devices that store data on storage media such as magnetic or optical data storage disks. In magnetic disk storage systems, a storage device is called a hard disk drive (HDD), which includes one or more storage disks and an HDD controller to manage local operations concerning the disks.

A number of known storage subsystems incorporate certain techniques and devices to predict storage device failures, along with other techniques and devices to protect data from being lost or corrupted by such failures. However, as discussed below, these systems do not adequately address methods or devices for utilizing drive error information within the storage device to prevent a read/write error from occurring.

There are several electromechanical performance parameters within a HDD that, when unobtrusively monitored, may provide warnings of impending drive failures. These parameters include but are not limited to: signal amplitude and resolution; head fly height; and channel noise signal coherence. A common method of utilizing such information is known to those skilled in the art as Predictive Failure Analysis (PFA).

Data storage systems, such as hard disk drives, commonly employ PFA as a self-diagnostic tool. PFA is usually implemented via micro-code instructions that control drive assemblies. The main purpose of PFA (sometimes referred as Self-Monitoring, Analysis and Reporting Technology, or "SMART") is to issue warnings to users that the hard disk drive is deteriorating and may "crash". PFA is implemented by performing periodic self-diagnostic tests. For example, PFA may be utilized to measure and compare current parameter values against those stored at the time of manufacture. PFA may also be utilized to examine the time rate of change of HDD performance parameters. An example of such a parameter is resolution, which is correlated to the fly height of a magneto-resistive (MR) head. Consistent with current implementations of PFA, a detected increase in resolution beyond some pre-determined threshold may trigger a PFA warning.

Data Recovery Procedure (DRP) is a common disk failure remedial operation that is invoked whenever a user initiates a command that fails to be properly executed by the hard disk drive. For example, a typical cause of read/write errors is improper positioning of the MR head by HDD control circuitry. The result may be a degraded signal-to-noise ratio that prevents the disk drive from properly decoding the read-back signal. In response to such a failed read attempt, the control circuitry may alert and trigger initiation of DRP processes. Thus, DRP is a collection of operations intended to alleviate the errors caused by disk drive failures. In the example above, one possible DRP operation would be to command the drive control circuitry to reposition the MR head. Unlike PFA, which is conducted during "standby" periods (periods between read/write operations), DRP is itself a type of read/write operation, and therefore occurs while the hard disk drive is in its read/write or "active" mode. Therefore, the time allotted to DRP is typically minimized to reduce its impact to user operations (to avoid jittery video for example). DRP is therefore geared to data recovery and is invoked in-stream with the user operations such as "read" and "write" operations.

Based on the foregoing, it can be appreciated that a need exists for an improved method and system that would allow the drive control circuitry to both predict and respond to deteriorating or otherwise non-optimal disk drive performance. Such a method and system, if implemented, would be useful by leveraging existing drive error prediction and recovery tools such as PFA and DRP so that faulty drive performance may be diagnosed and corrected in order to prevent a drive failure and the resulting loss of data.

SUMMARY OF THE INVENTION

It is therefore an object of the invention to provide a method and system for improving a digital storage system.

It is another object of the invention to provide an improved method and system for preventing hard disk drive failures.

It is still another object of the invention to provide an improved method and system for predicting a hard disk drive failure and taking corrective action to prevent such a failure.

It is yet another object of the invention to provide an improved method and system that utilize predictive failure analysis to determine that corrective action is necessary and undertaking such corrective action thereby minimizing hard disk drive failures and the effects thereof.

The above and other objects are achieved as is now described. A method in a data processing system for minimizing read/write errors caused by impaired performance of a hard disk drive during runtime operation of said hard disk drive is disclosed. The runtime operation includes an active mode and a standby mode. First, at least one performance parameter of a hard disk drive is monitored during a standby mode of operation. Next, in response to monitoring at least one performance parameter, preventive recovery action is periodically performed only during said standby mode of operation, such that said performance parameter is maintained at an acceptable value without interfering with hard disk drive operation during an active mode.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The method and system of the present invention provides a drive diagnostic and recovery feature that utilizes periods of read/write inactivity (referred to alternatively as "passive" or "out-of-stream" time) to perform recovery actions. The present invention optionally provides a linkage between the in-stream DRP operations and the out-of-stream recovery actions. With its emphasis on HDD runtime recovery and failure prevention, this feature will be referred to hereinafter as "Preventive Recovery Action" (PRA).

Predictive failure analysis (PFA) is commonly utilized in disk drive controllers as a diagnostic tool. Typically, PFA is implemented via microcode instructions utilized to control local disk drive operations conducted via the disk drive controller. In response to detecting an existing or imminent error, the microcode will respond to this error signal by posting an error signal. The disk drive user or the system itself may respond by taking the drive off-line or by taking data recovery action to retrieve data that was lost or compromised by the failure.

The present invention proposes expanding PFA functionality within a hard disk drive. In accordance with the teachings of the present invention, PFA may be utilized to diagnose possible causes of a particular problem, and initiate corrective action while the disk drive is operating. For example, the runtime detection of amplitude instabilities such as a head flying too low or too high could result in the application of a "reset" command to the GMR element or in the initiation of slider cleaning actions to clear debris. The method of the present invention includes detecting the error and issuing corrective measures.

Figure 1:
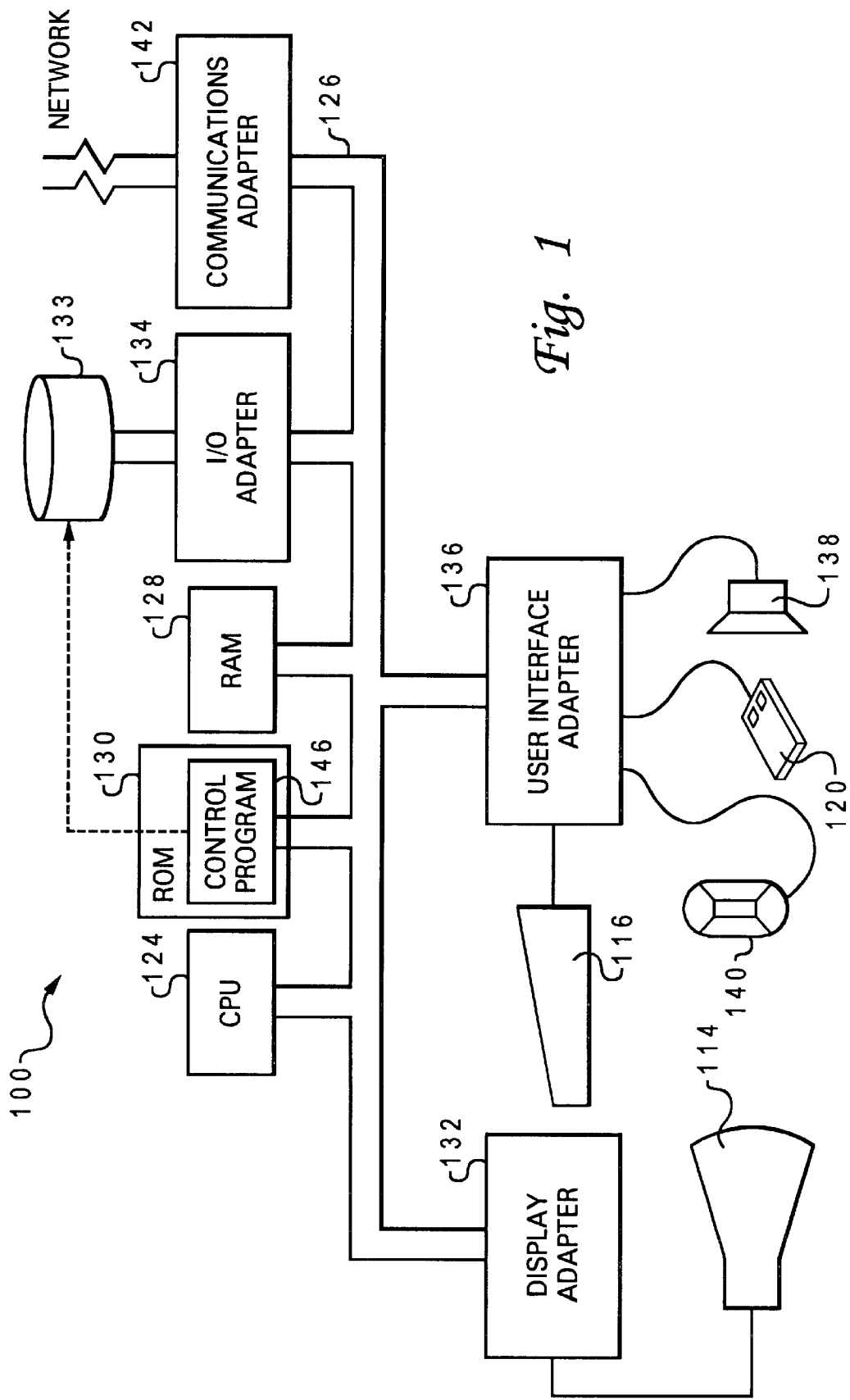
FIG. 1 depicts a data processing system in which the method and system of the present invention may be implemented.

With reference now to the figures and in particular with reference to FIG. 1, there is depicted a representative hardware environment of a data processing system with which the present invention may be implemented. Data processing system 100 in FIG. 1 is a configuration that includes functional components of a typical computer and its associated hardware. Data processing system 100 includes a Central Processing Unit ("CPU") 124, such as a conventional microprocessor, and a number of other units interconnected via system bus 126. CPU 124 includes a portion of data processing system 100 that controls the operation of the entire computer system, including executing the arithmetical and logical functions contained in a particular computer program. Although not depicted in FIG. 2, CPUs such as CPU 124 typically include a control unit that organizes data and program storage in a computer memory and transfers the data and other information between the various parts of the computer system.

Data processing system 100 further includes random-access memory (RAM) 128, read-only memory (ROM) 130, display adapter 132 for connecting system bus 126 to display device 114, and I/O adapter 134 for connecting peripheral devices (e.g., disk and tape drives 133) to system bus 126. RAM 128 is a type of memory designed such that the location of data stored in it is independent of the content. Also, any location in RAM 128 can be accessed directly without having to work through all memory content from the beginning. ROM 130 is a type of memory that retains information permanently and in which the stored information cannot be altered by a program or normal operation of a computer.

Display device 114 is the visual output of data processing system 100. Data processing system 100 further includes user interface adapter 136 for connecting keyboard 116, mouse 120, speaker 138, microphone 140, and/or other user interface devices, such as a touch-screen device (not shown), to system bus 126. Speaker 138 is one type of audio device that may be utilized in association with the method and system provided herein to assist diagnosticians or computer users in analyzing data processing system 100 for system failures, errors, and discrepancies. Communications adapter 142 connects data processing system 100 to a computer network. Although data processing system 100 is depicted as containing only a single CPU and a single system bus, it should be understood that, without departing from its spirit and scope, the method and system of the present invention may also be implemented within computer systems that have multiple CPUs, and to computer systems that have multiple buses that each perform different functions in different ways.

Data processing system 100 also includes an interface that resides within a machine-readable media to direct the operation of data processing system 100. Any suitable machine-readable media may retain the interface, such as RAM 128, ROM 130, a magnetic diskette, magnetic tape, or optical disk (the last three being located in disk and tape drives 133). Any suitable operating system and associated interface (e.g., Microsoft Windows) may direct CPU 124. For example, the AIX operating system and AIX windows windowing system can direct CPU 124. The AIX operating system is IBM's implementation of the UNIX™ operating system.

Those skilled in the art will appreciate that the hardware depicted in FIG. 1 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, disk drive 133 is connected to system bus 126 via I/O adapter 134. Control circuitry (not depicted in FIG. 1) within disk drive 133 communicates with a control program 146. In general control program 146 is comprised of microcode within ROM 130 that assists in controlling and coordinating basic input/output (I/O) operations such as read/write operations to and from input and output devices such as keyboard 116 and disk drive 133. Control program 146 directs operation of disk drive 133 by communicating with a disk controller (not depicted in FIG. 1) within disk drive 133. In accordance with the teachings of the present invention, control program 146 contains instructions that, when executed on CPU 124, may assist in carrying out the operations described in association with FIGS. 4, 5A, and 5B, described herein.

Figure 2:
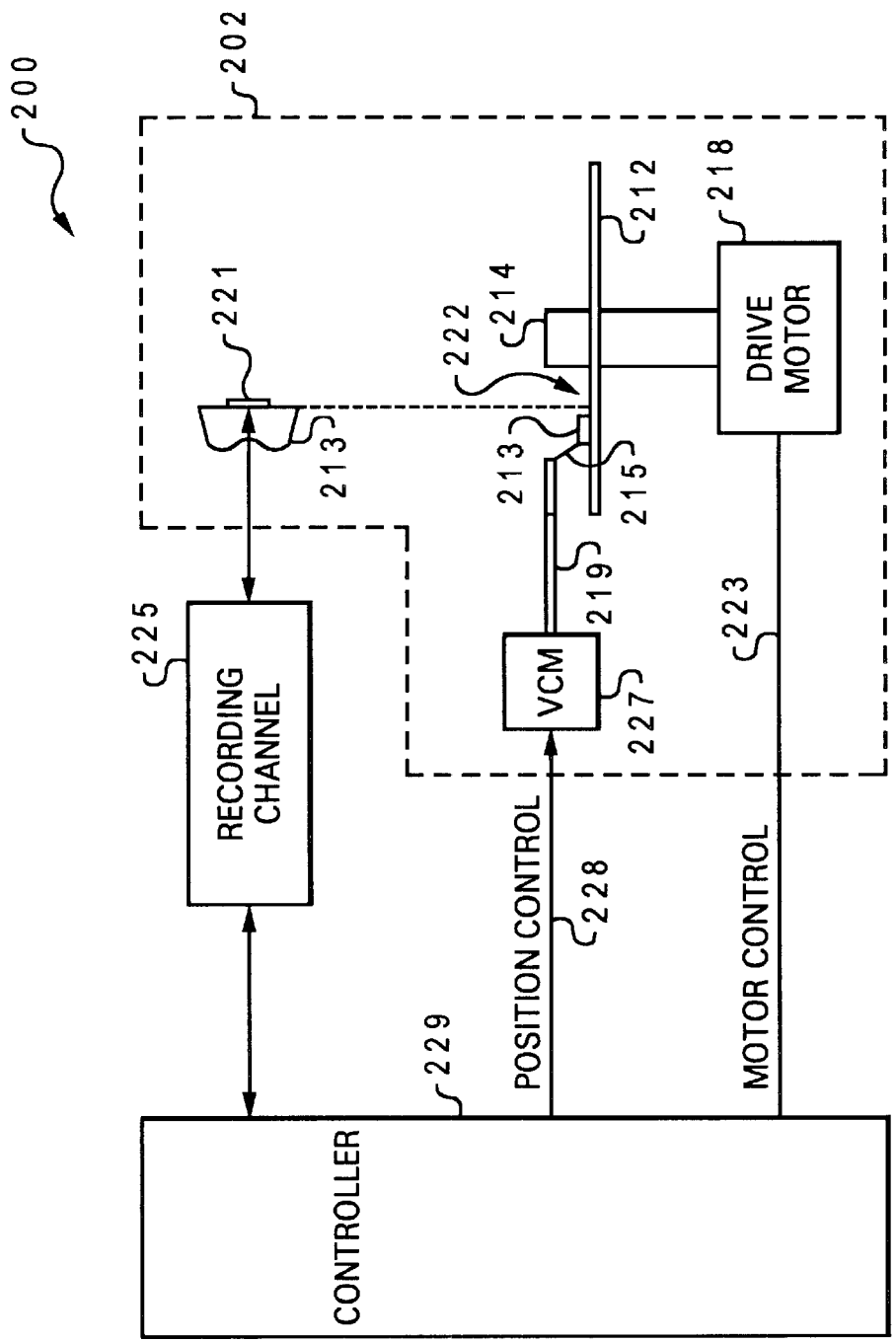
FIG. 2 illustrates a block diagram of a hard disk drive suitable for utilizing Preventive Recovery Action (PRA) in accordance with the teachings of the present invention.

Turning now to FIG. 2, there is depicted a block diagram of a magnetic disk storage system 200, suitable for utilizing Preventive Recovery Action (PRA) in accordance with the teachings of the present invention. The invention described hereinbelow is useful with all electromechanical configurations of magnetic storage disk drives or direct access storage devices (DASD). Also, it will be appreciated that the invention is also applicable to, and may be utilized by, other information storage systems such as an optical data storage system or a magnetic tape recording system, for example. Magnetic disk storage system 200 is comprised of a HDD 202 that is electromechanically connected to a disk controller 229 via a recording channel 225, a slider position control line 228, and a motor control line 223.

At least one rotatable magnetic disk 212 is supported on a spindle/hub 214 and rotated by a disk drive motor 218. The magnetic recording media on each disk is generally in the form of an annular pattern of concentric data tracks (not shown) on disk 212. At least one slider 213 is positioned on the disk 212, each slider 213 is supporting one or more magnetic read/write heads 221. As the disk(s) rotate, the sliders 213 are moved radially in and out so that the heads 221 may access different portions of the disk surface 222 containing the data. Each slider 213 is attached to an actuator arm 219 by means of a suspension 215. The suspension 215 provides a slight spring force which biases the slider 213 against the disk surface 222. Each actuator arm 219 is attached to an actuator means 227. It should be apparent that disk storage systems may contain a large number of disks and actuators, and each actuator may support a number of sliders.

The various components of HDD 202 are controlled in operation by signals generated by disk controller (read/write electronics) 229, such as access control signals and internal clock signals, and which includes logic control circuits, storage means and a microprocessor. Disk controller 229 generates control signals to control various system operations such as motor control signals on line 223 and head position control signals on line 228. The control signals on line 228 provide the desired current profiles to optimally move and position a selected slider 213 to the desired data track on the associated disk 212. Read and write signals are communicated to and from read/write heads 221 by means of recording channel 225, which includes conductor lines running along suspension 215 and actuator arm 219. In this manner, disk controller 229 controls physical and logical access to HDD 202.

Figure 3:
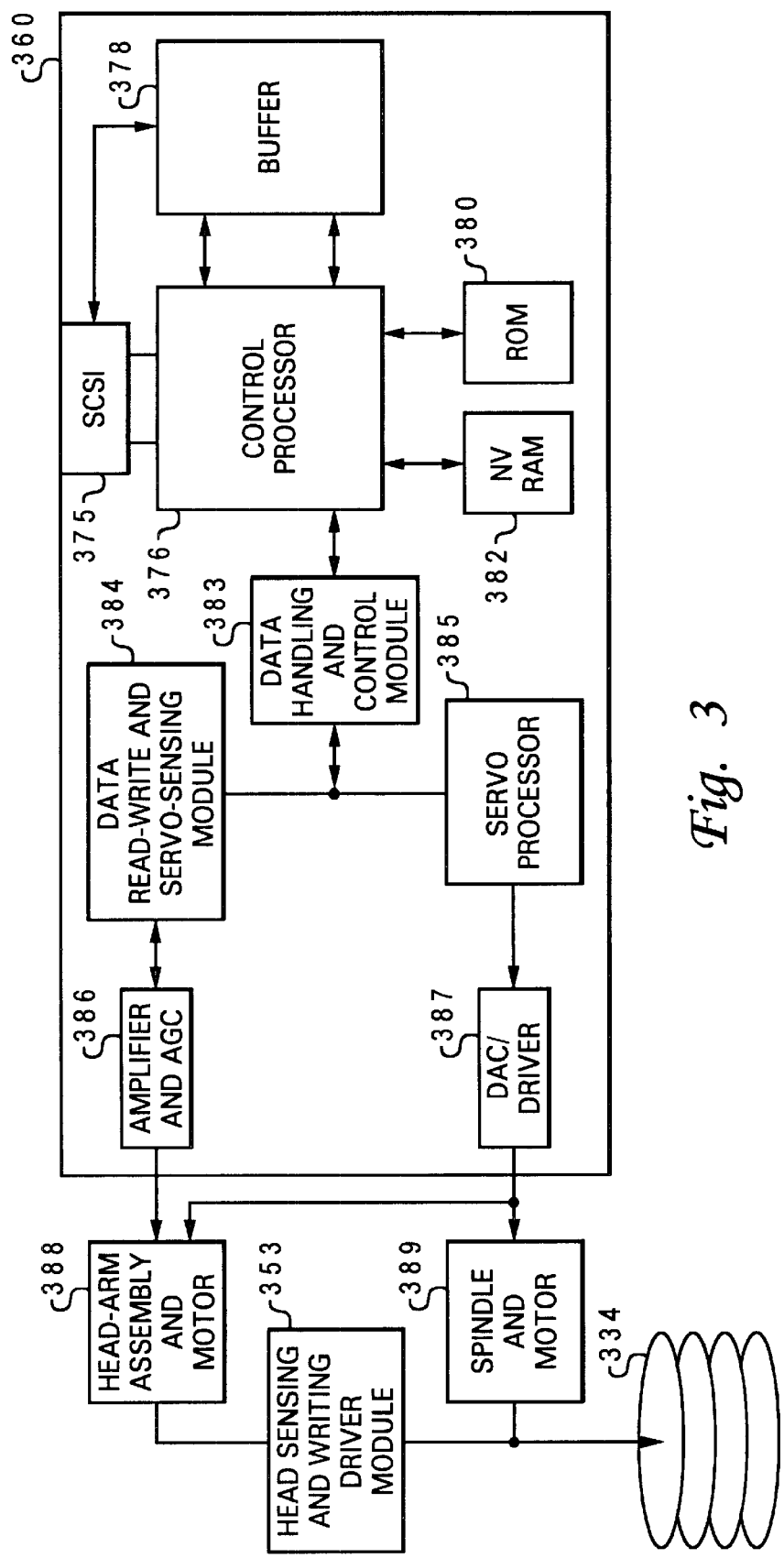
FIG. 3 depicts a block diagram of control circuitry within the hard disk drive of FIG. 2, with which the present invention may be implemented.

Referring now to FIG. 3, there is illustrated a block diagram of the control circuitry within magnetic storage system 200 of FIG. 2. Control circuitry 360, is contained within a HDD controller, such as disk controller 229. Control circuitry 360 communicates with a host processing unit, such as CPU 124, through an interface 375 such as a small computer system interface (SCSI). Control circuitry 360 controls the storage of data to, and the recovery of data from, disks 334. Control circuitry 360 comprises control processor 376, buffer 378, data-handling and control module 383, data read-write and servo-sensing module 384, servo processor 385, amplifier and automatic gain control (AGC) 386, and digital-to-analog converter (DAC)/motor driver 387.

Control processor 376 may be initialized upon system power up, or it may have access to a small read-only memory (ROM) 380 and a small non-volatile RAM (NVRAM) 382 for program instructions. ROM 380 may hold a supervisor program executable on control processor 376 to carry out the process of the invention. As provided by the invention, control processor 376 may access buffer 378 for commands of execution. In addition, buffer 378 is also for temporarily holding data in transit between a data processing system, such as data processing system 100 and disks 334. After the physical location on disks 334 has been determined by servo-sensing circuit within data read-write and servo-sensing module 384, servo processor 385 then sends signals, which is then converted to analog form for motor control by DAC/motor-driver 387. Head-arm assembly & motor 388 and spindle & motor 389 then access disks 334. Typically, servo processor 385 is a high-speed digital signal processor. Data read and write operations are performed by head-sensing and writing driver module 353, processed by amplifier and AGC 386 and data read-write circuits within data read-write and servo-sensing module 384. Data conversion, ECC, and control-timing functions are provided by data handling and control module 383.

Figure 4:
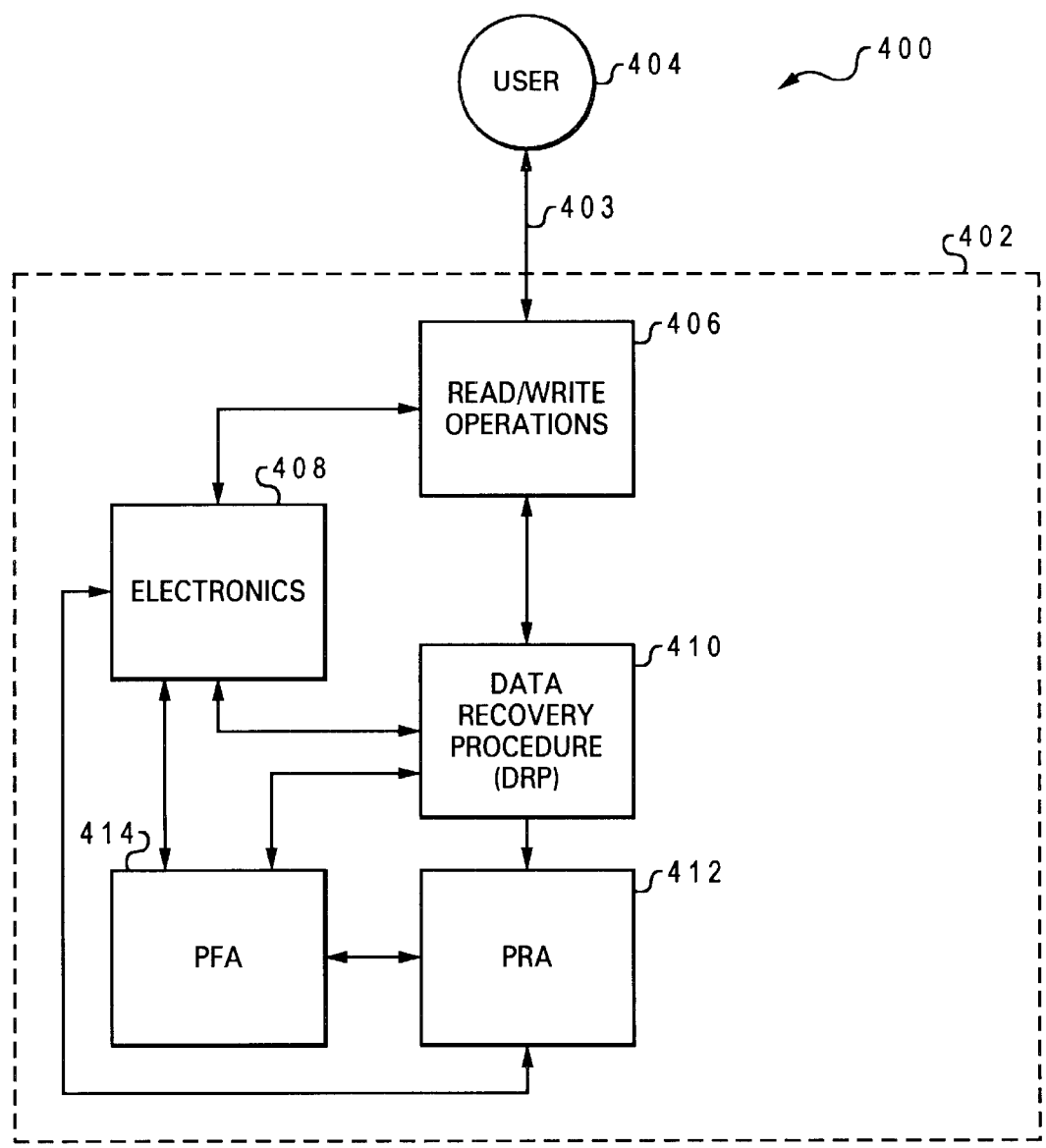
FIG. 4 illustrates a simplified block diagram of functional entities and operations, within a hard disk drive assembly, that may be utilized to perform runtime error detection and correction in accordance with a preferred embodiment of the present invention.

With reference now to FIG. 4, there is illustrated a simplified block diagram of operational entities within HDD 202 and control circuitry 360, that may be utilized to perform runtime error detection and correction in accordance with a preferred embodiment of the present invention. FIG. 4 depicts a user block 404 which is connected to a simplified model of an HDD 402 via an interface 403. Interface 403 may be a user input device such as keyboard 16 or mouse 20. Interface 403 may also be an computer output device such as display 14. Included within HDD 402 is read/write block 406 which represents read/write instructions delivered from a host computer system's CPU. Although depicted as residing within HDD 402, the instructions within read/write block 406 are initially generated by user 404 at interface 403. These instructions are delivered from interface 403 to a CPU and then to control circuitry within HDD 402.

The control circuitry within HDD 402, such as that depicted within control circuitry 360, is represented by block 408 and encompasses control circuitry 360 of FIG. 3. In accordance with the teachings of the present invention, HDD 402 also includes PFA instruction block 414, PRA instruction block 412, and DRP instruction block 410. It should be noted that although instruction blocks 410, 412, and 414 are depicted as distinct blocks within HDD 402, a preferred embodiment of the present invention would provide for the instructions within blocks 410, 412, and 414 to reside within control circuitry 408. In an alternate embodiment of the method and system of the present invention, DRP instructions 410, PRA instructions 412, and PFA instructions 414 may be distributed between both control circuitry 408 and a ROM, such ROM 380 within control circuitry 360, or ROM 130 of host data processing system 100.

As utilized hereinafter, the term "runtime operation" will refer to the operational mode of HDD 402. Runtime operation may be divided into two categories, "active mode" and "standby mode", each of which is significant with respect to implementing the method and system of the present invention. As utilized hereinafter, "active mode" describes a period during runtime operation when a read/write operation is currently underway (i.e. block 406 currently active). "Standby mode" will denote periods in between active periods, when read/write operations are not currently underway. It should be noted that as utilized herein, "standby mode" should not be confused with another non-operational mode commonly referred to in the art as "sleep mode", in which the HDD is automatically powered down. Sleep mode is therefore outside runtime operation of HDD 402.

The method and system of the present invention address the problem of detecting, diagnosing, and correcting the cause of HDD failures in a seamless manner during runtime operation. Impaired performance of an HDD, such as HDD 402, may be caused either by unpredictable or predictable factors. Among unpredictable factors are those that occur abruptly, and are sufficiently catastrophic so that there is no possibility of repairing the problem "on-the-fly". Examples of such unpredictable and unrecoverable failures include when a cable breaks, a component burns out or a solder connection fails. The only way to rectify such failures is by manually replacing or repairing the faulty component.

Another category of HDD failures include those that are sufficiently abrupt as to be unpredictable, and yet are correctable "on-the-fly". An example of such a failure is when a read/write head has been misaligned over a data track. Many possible causes for this type of failure are not the result of a "fatal" catastrophic event as described above, but instead may be caused by intermittent, correctable conditions such as vibrations due to mechanical shock, anomalous electrical disturbances, etc. If such a failure occurs in a sufficiently abrupt or unpredictable manner, PFA 414 cannot predict its initial occurrence.

The other general category of HDD failures, are those whose occurrence is preceded by some detectable performance degradation. A common cause of such failures is the gradual degradation of components that wear out as the drive ages. Other predictable drive failures are caused by more transient factors that may cause a performance parameter to exceed a pre-determined threshold. An example of this is inter-drive vibration interference that frequently occurs in multiple disk drive arrays such as Redundant Array of Independent Disks (RAID).

The method and system of the present invention may be utilized to address all the above failure types, except those that occur unpredictably and are unrecoverable on-the-fly (i.e. broken component that must be repaired or replaced). In a preferred embodiment of the present invention, PFA block 414 monitors at least one performance parameter of HDD 402 during standby periods of runtime operation. This type of monitoring is well known by those skilled in the art and is often generically referred to as Predictive Failure Analysis (PFA). The details regarding various methods of implementing PFA are well-known in the art and are incorporated herein by reference. A variety of performance parameters may be monitored by PFA block 414 in order to comprehensively assess the operability of HDD 402. These parameters include, but are not limited to mechanical operational attributes such as temperature and relative displacement and also electrical attributes such as signal amplitude.

During standby operation of HDD 402, PFA block 414 monitors pre-selected performance parameters and interprets the results, thereby providing an indication of impaired performance of HDD 402. In an important feature of the present invention, whenever PFA block 414 detects that a monitored parameter has exceeded a predetermined threshold, PFA block 414 responds by delivering an "error" signal to PRA block 412. PRA block 412 may then respond to this error signal by briefly performing an analysis of the information contained in the error signal such that a cause of the problem may be diagnosed.

Figure 5A:
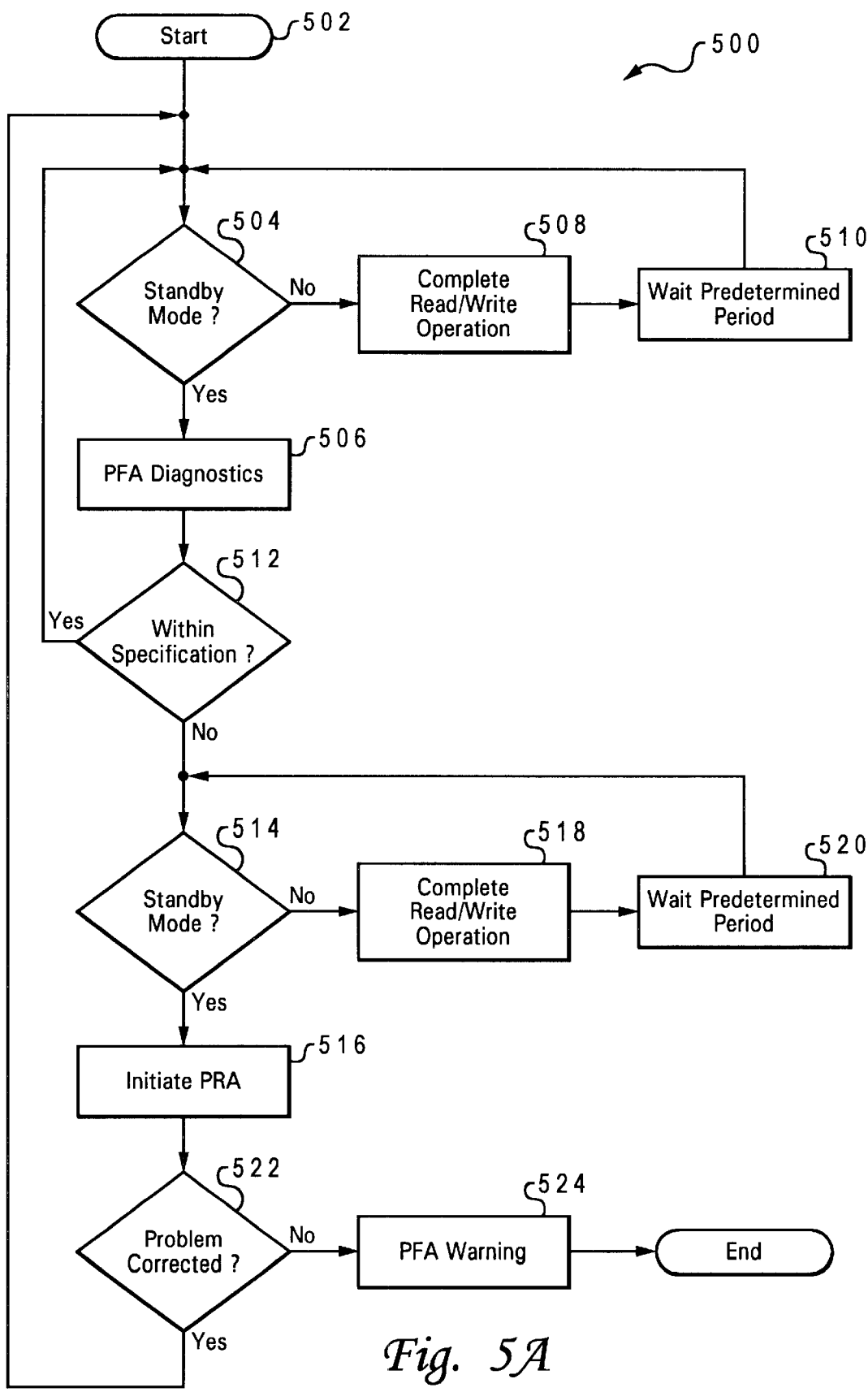
FIG. 5A depicts a sequence of steps that illustrate one embodiment of the present invention in which PRA is periodically performed as needed during standby mode of HDD operation.

With reference now to FIG. 5A, there is depicted a high level logic flowchart of a process by which Predictive Failure Analysis (PFA) is utilized to monitor performance parameters of a HDD, such as HDD 402, during standby mode of HDD runtime operation. The process begins at start block 502 which signifies that runtime operation of a HDD has begun. This runtime operation includes both an active and a standby mode of operation. Standby mode of operation includes those periods of time in which data storage access has not been attempted for a predetermined period of time. The process proceeds to steps 504, 508, and 510, which depict steps that are periodically taken to determine whether a HDD is in standby mode.

After standby mode has been verified, the process proceeds to step 506, at which PFA diagnostics are commenced. These PFA diagnostics include monitoring selected performance parameters of a HDD. These performance parameters may include, but are not limited to: electromagnetic parameters of the HDD, fly height, channel noise, etc. The process then proceeds to step 512 which illustrates that, in response to the diagnostics depicted at step 506, a determination is made whether the monitored parameters remain within an acceptable range of values. If a performance parameter has exceeded its predetermined threshold value, then, as illustrated at steps 514, 518, 520 and 516, PRA is initiated and performed only during standby mode of HDD operation. This PRA is implemented by instructions that first interpret the information received from PFA diagnostics depicted at step 506 so that a cause of the erroneous performance parameter may be determined. After determining the cause of the erroneous performance parameter, PRA then instructs a HDD controller or other equivalent mechanisms to undertake corrective action. In this manner, necessary adjustments are made to components and devices within a HDD, such that performance parameters are maintained at acceptable values without interfering with HDD operation during its active (read/write) mode. As illustrated at steps 522 and 524, if PRA is unable to effectively remedy the cause of the erroneous performance parameter, a warning is issued to the user of the data processing system so that the HDD may be taken off-line and further examined. If the problem is remedied by PRA, the sequence resumes at step 504.

Figure 5B:
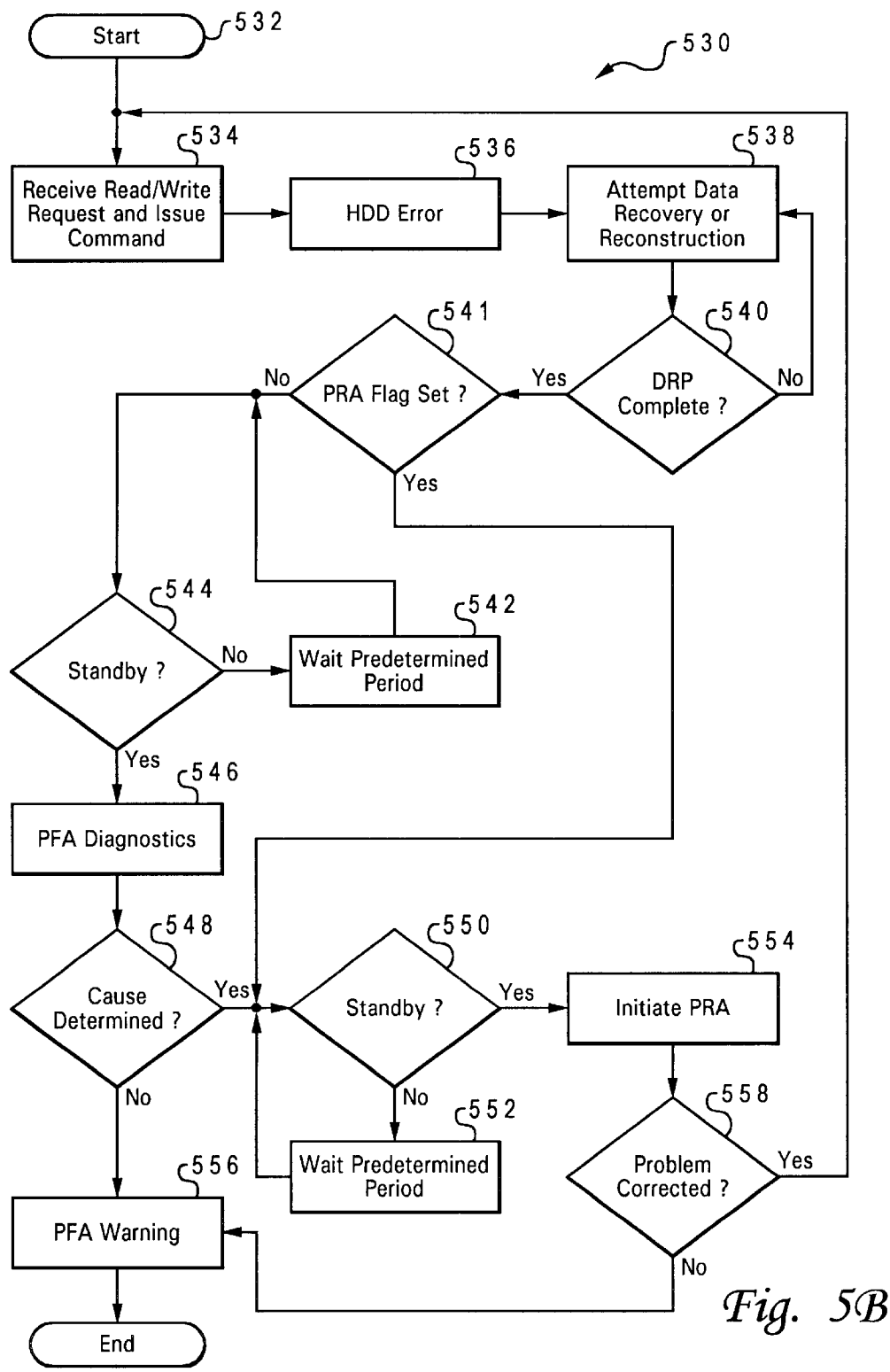
FIG. 5B illustrates a sequence of steps that depict an alternate embodiment of the present invention in which PRA is activated in response to a read/write error.

Turning now to FIG. 5B, there is illustrated a high level flowchart of a process 530 depicting an alternate embodiment of the present invention in which PRA is utilized in conjunction with Data Recovery Procedure (DRP), in response to a failed read/write operation. As in flowchart 500, process 530 commences as illustrated at step 532 by activating a HDD within a data processing system. Next, a read or write request is received by the activated HDD, as depicted at step 534. Thereafter, as illustrated at step 536, an HDD error is detected. This error may prevent the read/write operation from being successfully completed, which in turn necessitates an attempted data recovery or reconstruction operation (DRP) as depicted at step 538. During DRP operations, a status code may be generated to communicate with PFA diagnostic mechanisms. In this manner, instructions utilized to implement DRP may direct PFA mechanisms to initiate specific diagnostic actions or to commence PRA directly. In the embodiment exemplified, and as illustrated at step 541, a check is made to determine whether a PRA initiation flag is set. If a PRA initiation flag is set, then the recovery process proceeds directly to PRA at step 554. If a PRA initiation flag has not been set by DRP processes, then PFA diagnostics, as described at step 506 of FIG. 5A, are commenced only during a standby mode of HDD operation as depicted at steps 544, 542, and 546. As depicted at step 540, the determination of whether a PRA initiate flag is set is made after a determination has been made that the DRP is complete or has otherwise been terminated.

After PFA diagnostics are performed, and as depicted at step 548, the results of the PFA diagnostics are utilized in attempting to determine the cause of the HDD error detected at step 536. If the cause is successfully determined, then, as illustrated at steps 550, 552, and 554, PRA is initiated and performed only during standby mode of HDD operation in an attempt to remedy the cause of the read/write error. If a cause cannot be determined, or cannot be effective addressed by PRA then as illustrated at steps 558 and 556, a PFA warning is issued to the user.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described in association with FIGS. 5A and 5B can be accomplished with a computer-aided device. In such a method, data stored in a memory unit of a data-processing system such as a data-processing system, can represent steps in a method for implementing a preferred embodiment of the present invention.

What is claimed is:

1. A method in a data processing system for minimizing read/write errors caused by impaired performance of a hard disk drive during runtime operation of said hard disk drive, said runtime operation including an active mode during which read/write operations are performed and a standby mode during which no read/write operation is underway, said method comprising the steps of:

monitoring at least one performance parameter of a hard disk drive during said standby mode of operation; and in response to detecting a degraded value of said at least one performance parameter during said monitoring, performing preventive recovery action only during said standby mode of operation, wherein said preventive recovery action includes restoring said performance parameter to an acceptable value without interfering with hard disk drive operation during an active mode.

2. The method of claim 1 wherein said performance parameter is signal resolution, and wherein said step of performing preventive recovery action comprises the step of adjusting a fly height of a read/write head within said hard disk drive, such that said signal resolution is maintained at an acceptable level.

3. The method of claim 1, wherein said data processing system includes a disk drive controller associated with said disk drive, said method further comprising the steps of:

during said step of monitoring at least one performance parameter, detecting a degradation of said performance parameter beyond a pre-determined value; and in response to detecting a degradation of said performance parameter, performing preventive recovery action during said standby mode, wherein said preventive recovery action instructs said disk drive controller to undertake corrective action to rectify the degraded performance parameter.

4. The method of claim 1, further comprising the steps of:

detecting a read/write error during said active mode of operation, said error having a cause that is correlated to said performance parameter; and in response to detecting a read/write error during said active mode of operation, examining said performance parameter during said standby mode, such that said cause may be diagnosed and further read/write errors prevented.

5. The method of claim 4, further comprising the step of correlating said preventive recovery action to said cause of said read/write error, such that said cause may be corrected.

6. The method of claim 4, wherein said step of examining said at least one performance parameter is preceded by the steps of:

initiating a data recovery procedure during said active mode; and upon completion of said data recovery procedure, initiating preventive recovery action during said standby mode, such that a subsequent read/write error may be prevented.

7. The method of claim 6, wherein the step of initiating preventive recovery action during said standby mode is followed by the steps of:

determining whether said cause has been corrected by said preventive recovery action;

in response to said cause having been corrected, continuing said runtime operation of said hard disk drive; and in response to said cause having not been corrected, utilizing predictive failure analysis to issue a warning, such that said hard disk drive may be taken off-line.

8. A system for preventing read/write failures within a hard disk drive during runtime operation of said hard disk drive, said runtime operation including an active mode during which read/write operations are performed and a standby mode during which no read/write operation is underway, said hard disk drive including a controller for providing electromechanical control of said hard disk drive, said system comprising:

means within a disk controller for monitoring a performance parameter of said hard disk drive during said standby mode of operation;

means responsive to a detected degradation of said performance parameter for producing an error signal indicative of a potential hard disk drive failure; and means responsive to receiving said error signal for initiating preventive recovery action only during a standby mode of operation, wherein said preventive recovery action includes restoring said performance parameter to an acceptable value without interfering with hard disk drive operation during an active mode.

9. The system of claim 8, wherein said means for monitoring a performance parameter of a hard disk drive and said means for producing an error signal in response to detection of a potential hard disk drive failure, are predictive failure analysis instruction means.

10. The system of claim 9, further comprising:

a controller for providing electromechanical control of said hard disk drive, said controller receiving and executing said predictive failure analysis instructions.

11. The system of claim 9, wherein said means for initiating preventive recovery action only during a standby mode of operation are preventive recovery action instruction means included within said controller.

* * * * *